United States Patent [19]

Binda et al.

[11] Patent Number: 5,124,387

[45] Date of Patent: Jun. 23, 1992

[54] TRIBOELECTRICALLY PROCESSABLE POWDER COATING

[75] Inventors: Paul H. G. Binda; Tosko A. Misev, both of Zwolle, Netherlands

[73] Assignee: DSM N.V., Heerlen, Netherlands

[21] Appl. No.: 431,842

[22] Filed: Nov. 6, 1989

[30] Foreign Application Priority Data

Nov. 9, 1988 [NL] Netherlands .......................... 8802748
Nov. 26, 1988 [NL] Netherlands .......................... 8802913

[51] Int. Cl.$^5$ ............................................. C08L 31/06
[52] U.S. Cl. ................... 524/251; 524/236; 524/904; 524/247; 524/248; 525/934
[58] Field of Search ................ 525/934; 524/904, 251

[56] References Cited

U.S. PATENT DOCUMENTS 4,933,252  6/1990  Nishikawa et al. ................ 430/109
4,990,424  2/1991  Van Dusen et al. ................ 430/126
4,997,907  5/1991  Marten et al. ...................... 528/272

FOREIGN PATENT DOCUMENTS 3600395  8/1987  Fed. Rep. of Germany .

OTHER PUBLICATIONS

European Search Report dated Apr. 9, 1990.

*Primary Examiner*—Paul R. Michl
*Assistant Examiner*—Tae H. Yoon
*Attorney, Agent, or Firm*—Cushman, Darby & Cushman

[57] ABSTRACT

The invention relates to a triboelectrically processable powder coating based on a polyester-containing binding agent and a nitrogen-containing additive. The nitrogen-containing additive is a sterically hindered tertiary amine or aminoalcohol.

7 Claims, No Drawings

TRIBOELECTRICALLY PROCESSABLE POWDER COATING

The invention relates to a triboelectrically processable powder coating based on a polyester-containing binding agent and a nitrogen-containing additive.

Such a powder coating has previously been described in DE-A-3600395. Powder coatings are frequently sprayed onto earthed surfaces to be coated, using electric spray guns. Guns generating electrically charged particles by friction ('triboelectric') are used notably for the application of top coats on strongly curved articles comprising Faraday cages. It is difficult for powder coatings substantially based on polyesters to be applied via a triboelectric process, because they have a low charging potential.

From DE-A-3600395 it is known that the addition of triethylamine does indeed have a positive effect on the chargeability of the particles. Triethylamine however decreases the stability of powder coatings because of an undesired catalytic activity with respect to the curing reaction if epoxy compounds are used in the binding agent.

The invention provides a solution for this problem.

The triboelectrically processable powder coating based on a polyester-containing binding agent and a nitrogen-containing additive is characterized in that the nitrogen-containing additive is a sterically hindered tertiary amine or aminoalcohol.

The nitrogen-containing additives must show no or very small catalytic activity and thus not influencing the kinetic of the curing process. The nitrogen-containing additive should not decrease the gel time of the coating more than ⅔, preferably 5/6, compared to the gel time of the additive free system.

According to a preferred embodiment of the invention, the sterically hindered tertiary amine or aminoalcohol is an amine having the formula:

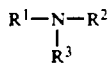

where $R^1$, $R^2$ and $R^3$ are alkyl groups or aryl groups and where at least one of the $R^1$, $R^2$ and $R^3$ groups is a branched alkyl group with at least 3 carbon atoms.

In the case of an aminoalcohol, at least one of the three groups contains a hydroxyl group.

According to a preferred embodiment of the invention the nitrogen-containing additive is a sterically hindered tertiary amine containing at least two hydroxyl groups. Preferably the hindered tertiary amine or aminoalcohol is an amine having the formula

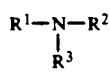

where $R^1$, $R^2$ and $R^3$ are alkyl groups or aryl groups and where at least one of the $R^1$, $R^2$ and $R^3$ groups is a branched alkyl group with at least 3 carbon atoms, and where $R^1$, $R^2$ and/or $R^3$ contain two hydroxyl groups.

Preferably $R^1$ contains 1-10 carbon atoms, $R^2$ 1-10 carbon atoms and $R^3$ 3-10 carbon atoms.

According to a further preferred embodiment of the invention $R^3$ contains at least 4 carbon atoms.

The alkyl groups of the nitrogen-containing additive are preferably so branched that at the $\alpha$-positions in respect of the nitrogen atom there is at least 1 carbon atom linked with two carbon atoms or that at the $\beta$-positions there are at least two carbon atoms each of them linked with three carbon atoms or 1 carbon atom is present linked with four carbon atoms.

The nitrogen-containing additive preferably contains at $\alpha$- and/or $\beta$-positions at least two, particularly at least three carbon atoms that are linked—as described above—with carbon atoms.

According to a preferred embodiment of the invention, the sterically hindered tertiary amine or aminoalcohol applied is N,N-diisobutyl-3-amino-2,4-dimethylpentane.

Other suitable sterically hindered tertiary amines are, for instance, N,N-dimethyl-3-amino-2,4-dimethylpentane and 2-methyl-N,N-bis(2-methylpropyl)-1-propaneamine.

According to another preferred embodiment of the invention, the sterically hindered tertiary amine or aminoalcohol is tertiary butyldiethanol amine.

Other suitable sterically hindered tertiary amines or aminoalcohols are, for instance, N,N-dimethyl-3-amino-2,4-dimethylpentane; 2-methyl-N,N-bis(2-methylolpropyl)-2-propaneamine; N,N-diethaynol-3-amino-2,4-dimethylpentane; diisopropylethanolamine and dimethylneopentanolamine.

The nitrogen-containing additive according to the invention can be used in combination with other sterically hindered compounds such as, for instance, sterically hindered secondary amines or sterically hindered alcohols.

According to a preferred embodiment of the invention the amount of nitrogen-containing additive is 0.01-10% (wt) calculated on the formulation powder coating composition.

The polyesters that are used are carboxyl-functional polyesters or hydroxyl-functional polyesters. The binder system preferably contains 97-40% (wt) polyester, more particularly 95-50% (wt) polyester.

The compound according to the invention can be used, for instance, in a powder coating the binding agent of which substantially comprises 94-90 parts by weight polyester with an acid number of between 10 and 80 and as curing agent 6-10 parts by weight epoxy compound. The epoxy compound applied may, for instance, be triglycidylisocyanurate (TGIC) or diglycidylterephthalate. However, by applying, for instance, epoxies based on bisphenol-A, it is possible also to produce binding agents in which the epoxy:polyester ratio is between 20:80 and 50:50. The polyester is preferably based on aromatic dicarboxylic acids, such as iso- and terephthalic acid, and aliphatic glycols such as, for instance, neopentyl glycol, butane diol and propylene glycol.

According to a preferred embodiment of the invention the polyester for the triboelectrically processable powder coating based on aromatic acids and glycols is characterized in that a part of the glycols consist of a sterically hindered tertiary amine containing at least two hydroxyl groups.

Trifunctional monomers such as, for instance, trimethylolpropane and trimellitic acid can be used in minor amounts. Optionally a tertiary amine can be used having three or more hydroxyl groups, so that this compound also serves as a branching agent.

Mostly, the binder components, catalyst and additives are first melted and mixed in an extruder and subsequently cooled and ground to form a powder that can be used, for instance, for the coating of metal parts used particularly in the open air.

The additives applied are, for instance, colourants, UV stabilizer, flow-promoting agents and antifoaming agents.

The nitrogen-containing additive can be added to the binding agent during the cooling of the resin, during the cooking of the resin or, in the extruder, during the powder coating production process. The nitrogen-containing resin can be added to the curing agent, too.

The sterically hindered tertiary amine containing at least two hydroxyl groups is added preferably during the preparation of the polyester, so that the additive is copolymerized. As a result, diffusion of the additive from the coating is avoided.

The coating of a substrate with a powder coating is effected by spraying the present powder coating with a tribo system.

Tribo systems are described, for instance, in Opperv-laktetechnieken (31) 1987, no. 2, pp. 28-31, and Farbe und Lack 10/1985, pp. 900-906.

The invention will further be elucidated in the examples below without being limited thereto.

EXAMPLES

EXAMPLES I-V AND COMPARATIVE EXAMPLES 1-2

Seven powder coatings were produced by mixing the components mentioned in Table I (in units by weight) in an extruder. As compound A N,N-diisobutyl-3-amino-2,4-dimethyl-pentane, as compound B N,N-dimethyl-3-amino-2,4-dimethylpentane, as compound C 2-methyl-N,N-bis-2-methylpropyl-1-propaneamine, as compound D diisopropylethanolamine, as compound E dimethyl-neopentanolamine and as comparative compound F triethylamine were used.

TABLE I

| Formulation | I | II | III | IV | V | 1 | 2 |
|---|---|---|---|---|---|---|---|
| polyester[1] | 558 | 558 | 558 | 558 | 558 | 558 | 558 |
| TGIC[2] | 42 | 42 | 42 | 42 | 42 | 42 | 42 |
| TiO$_2$ | 300 | 300 | 300 | 300 | 300 | 300 | 300 |
| flow-prom. agent[3] | 9 | 9 | 9 | 9 | 9 | 9 | 9 |
| benzoin | 4.5 | 4.5 | 4.5 | 4.5 | 4.5 | 4.5 | 4.5 |
| compound A | 1 | — | — | — | — | — | — |
| compound B | — | 0.6 | — | — | — | — | — |
| compound C | — | — | 0.8 | — | — | — | — |
| compound D | — | — | — | 0.64 | — | — | — |
| compound E | — | — | — | — | 0.57 | — | — |
| compound F | — | — | — | — | — | — | 0.45 |

[1]Uralac P 5000; ex DSM Resins
[2]Araldite PT 810; ex Ciba Geigy
[3]Resiflow PV 5; ex Worlée Chemie The chargeability and curing characteristics are mentioned in Table II. The gun used for the triboelectric spraying of the powder coatings was a Ransburg-Gema HT 100 gun. The DSC (differential scanning calorimetry) measurements were carried out on a Mettler TA 3000. In order to obtain a proper triboelectric process, chargeability up to at least 2 µA will be necessary.

TABLE II

| Formulation | I | II | III | IV | V | 1 | 2 |
|---|---|---|---|---|---|---|---|
| Tribochargeability (µA) | 3.3 | 3.2 | 3.3 | 3.0 | 2.5 | 0.4 | 3.6 |
| DSC characteristic: | | | | | | | |
| initial curing (°C.) | 124 | 120 | 122 | 110 | 123 | 120 | 107 |
| peak max. (°C.) | 189 | 190 | 191 | 185 | 188 | 189 | 186 |
| final curing (°C.) | 253 | 250 | 253 | 243 | 241 | 250 | 227 |
| reaction heat (J/g) | 22.2 | 21.7 | 21.5 | 28.0 | 21.1 | 21.5 | 26.7 |
| gel time (s) | 190 | 185 | 185 | 130 | 130 | 190 | 110 |

The measurements based on formulations I up to and including V and 1 show that the addition of additives containing sterically hindered nitrogen results in tribochargeability of the powder beyond 2 µA as well as in a good flow.

The measurements based on formulation 2 show that the tribochargeability is indeed sufficient, but that this formulation results in such a high reactivity that the flow obtained is not good.

EXAMPLES VI-VIII AND COMPARATIVE EXAMPLES 3-5

In these Examples, respectively Comparative Examples, the effect of N,N-diisobutyl-3-amino-2,4-dimethyl-pentane (='Compound A') on the chargeability in hybride systems based on polyesters and epoxy resins was determined.

TABLE III

| | parts by weight | | | | | |
|---|---|---|---|---|---|---|
| Formulation | VI | VII | VIII | 3 | 4 | 5 |
| polyester (a.n.: 35)[1] | 420 | — | — | 420 | — | — |
| polyester (a.n.: 50)[2] | — | 360 | — | — | 360 | — |
| polyester (a.n.: 80)[3] | — | — | 300 | — | — | 300 |
| epoxy resin[4] | 180 | 240 | 300 | 180 | 240 | 300 |
| TiO$_2$ | 300 | 300 | 300 | 300 | 300 | 300 |
| flow-promoting agent[5] | 9 | 9 | 9 | 9 | 9 | 9 |
| benzoin | 4.5 | 4.5 | 4.5 | 4.5 | 4.5 | 4.5 |
| compound A | 1 | 1 | 1 | 0 | 0 | 0 |
| chargeability | 3.5 | 4.0 | 2.2 | 1.0 | 1.0 | 0.8 |
| gel time (sec) | 145 | 120 | 130 | 145 | 115 | 130 |

[1]Uralac P 3560; ex DSM Resins
[2]Uralac P 2230; ex DSM Resins
[3]Uralac P 2127; ex DSM Resins
[4]Araldite GT 7004; ex Ciba Geigy
[5]Resiflow PV5, ex Worlée Chemie

EXAMPLE IX

A polyester resin was produced by esterifying 633 kg terephthalic acid, 13 kg trimethylolpropane, 478 kg neopentylglycol and 4 kg tertiary butyldiethanolamine for 12 hours at 250° C. to an OH-value of 38 during distillation of water. Subsequently, 93 kg isophthalic acid was added, followed by heating for three hours more until an acid number of 36 is reached. The polyester resin obtained was cooled and ground. After mixing in an extruder with 7% (wt) triglycidylisocyanurate (calculated on the polyester) and 50% (wt) titaniumdioxide (calculated on the binding agent), 1.5% (wt) flow-promoting agent and 0.8% (wt) benzoin, the mixture was cooled and ground.

The gun used for the triboelectric spraying of the powder coating was a Ransburg-Gema HT 100 gun. In order to obtain a proper triboelectric process, chargeability up to at least 2 µA will be necessary. The chargeability and curing characteristics were both good because they were respectively 2,2 µA and 160 seconds.

We claim:
1. Triboelectrically processable powder coating comprising a polyester-containing binding agent and a nitrogen-containing additive, wherein the nitrogen-containing additive is a sterically hindered tertiary amine or aminoalcohol.

2. Powder coating according to claim 1, wherein the sterically hindered tertiary amine or aminoalcohol is an amine having the formula

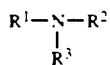

where $R^1$, $R^2$ and $R^3$ are alkyl groups, aryl groups, hydroxyl alkyl groups or hydroxyl aryl groups and where at least one of the $R^1$, $R^2$ and $R^3$ groups is a branched alkyl group with at least 3 carbon atoms.

3. Powder coating according to claim 1, wherein the sterically hindered tertiary amine or aminoalcohol is an amine having the formula

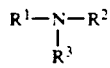

where $R^1$, $R^2$ and $R^3$ are alkyl groups, aryl groups, hydroxyl alkyl groups or hydroxyl aryl groups and where at least one of the $R^1$, $R^2$ and $R^3$ groups is a branched alkyl group with at least 3 carbon atoms, and where $R^1$, $R^2$ or $R^3$ contain two hydroxyl groups.

4. Powder coating according to claim 2, characterized in that $R^1$ contains 1-10 carbon atoms, $R^2$ contains 1-10 carbon atoms and $R^3$ contains 3-10 carbon atoms.

5. Powder coating according to claim 2, wherein when $R^1$, $R^2$ and $R^3$ are alkyl groups the alkyl groups of the nitrogen-containing additive are so branched that at the $\alpha$-positions in respect of the nitrogen atom there is at least 1 carbon atom linked with two carbon atoms or that at the $\beta$-positions there are at least two carbon atoms linked each of them with three carbon atoms or 1 carbon atom is present linked with four carbon atoms.

6. Powder coating according to claim 1, characterized in that the sterically hindered tertiary amine or aminoalcohol used is N,N-diisobutyl-3-amino-2,4-dimethylpentane.

7. Powder coating according to claim 1, characterized in that the sterically hindered tertiary amine or aminoalcohol used is tertiary butyldiethanolamine.

* * * * *